United States Patent [19]

Sugimoto

[11] Patent Number: 4,558,363
[45] Date of Patent: Dec. 10, 1985

[54] GAMMA CORRECTION CIRCUIT

[75] Inventor: Yasuhiro Sugimoto, Yokohama, Japan

[73] Assignee: Tokyo Shibaura Denki Kabushiki Kaisha, Kawasaki, Japan

[21] Appl. No.: 461,530

[22] Filed: Jan. 27, 1983

[30] Foreign Application Priority Data

Jan. 29, 1982 [JP] Japan ................................ 57-12813

[51] Int. Cl.⁴ .............................................. H04N 5/20
[52] U.S. Cl. .................................... 358/164; 328/142
[58] Field of Search ........................ 358/164, 166, 32; 328/142, 143

[56] References Cited

U.S. PATENT DOCUMENTS

| 2,692,333 | 10/1954 | Holmes | 358/164 |
| 3,534,168 | 10/1970 | Van Lookeren | 358/164 |
| 3,970,774 | 7/1976 | Bazin et al. | 358/164 |
| 4,015,079 | 3/1977 | Satou | 358/164 |

FOREIGN PATENT DOCUMENTS

| 1762353 | 4/1970 | Fed. Rep. of Germany | 358/164 |
| 2060459 | 12/1970 | Fed. Rep. of Germany | 358/164 |
| 2130647 | 6/1971 | Fed. Rep. of Germany | 358/164 |
| 1534777 | 8/1968 | France | 358/164 |
| 962288 | 7/1964 | United Kingdom | 358/164 |

Primary Examiner—Tommy P. Chin
Attorney, Agent, or Firm—Finnegan, Henderson, Farabow, Garrett & Dunner

[57] ABSTRACT

A gamma correction circuit to adjust the output of a video signal to the particular picture tube used including an exponential impedance changing element for gamma-correcting a non-gamma corrected input signal to produce a gamma-corrected signal. A current adder circuit adds the gamma-corrected signal to the non-gamma corrected input signal and includes a double balance type adder coupled to a series arrangement of variable and fixed DC voltage sources. The adder circuit has a combination of resistance means to add the gamma-corrected signal to the non-gamma corrected input signal at the desired adding ratio, while maintaining the signal levels of the gamma-corrected signal and the non-gamma corrected input signal coincident.

7 Claims, 11 Drawing Figures

INPUT

FIG. 2B
*PRIOR ART*

OUTPUT

INPUT

F I G. 4B
*PRIOR ART*

OUTPUT

GAMMA CORRECTION CIRCUIT

BACKGROUND OF THE INVENTION

I. Field of the Invention:

This invention relates to a gamma correction circuit for the picture signal used in the TV signal transmission end.

II. Description of the Prior Art:

As is known in this field, the output of a TV camera has to be gamma corrected because of the characteristics of a cathode-ray (picture) tube in the receiver end. The reason will be explained more in detail.

The luminance (brightness) signal voltage is not linearly proportional to the luminance of the screen in the typical picture tube. When the luminance signal voltage is low, luminance variation is small respect to with a unit change in voltage. However, when the luminance signal voltage is high, luminance variation is great with respect to the same, which represents an exponential curve. Namely, the light output from the picture tube is not proportional to the voltage driving it. When a picture signal including a luminance signal proportional to the luminance of the picture image taken by a TV camera is broadcasted from the transmission end without any correction, the luminance of the picture image displayed at the receiver end differs from its actual luminance. In order to avoid this inconvenience, it is required that the luminance signal obtained by the TV camera is corrected to have the characteristics opposite to the exponential characteristics and thereafter is broadcasted from the transmission end.

Figure 1:
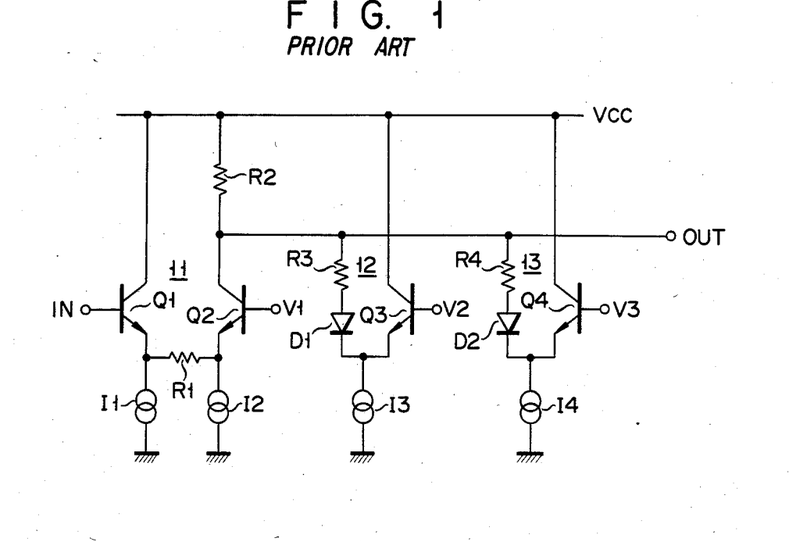
FIG. 1 shows a circuit diagram of a first conventional gamma correction circuit.
Figure 2A:
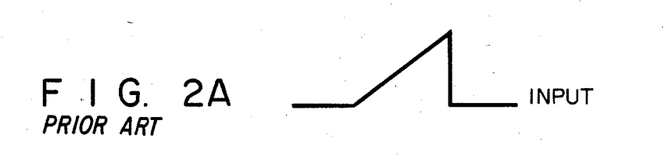
FIGS. 2A and 2B show waveform charts of input and output signals obtained in the circuit of FIG. 1.
Figure 2B:
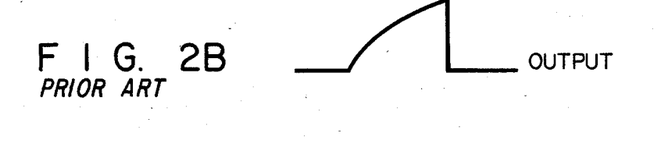
Figures 3, 4A:
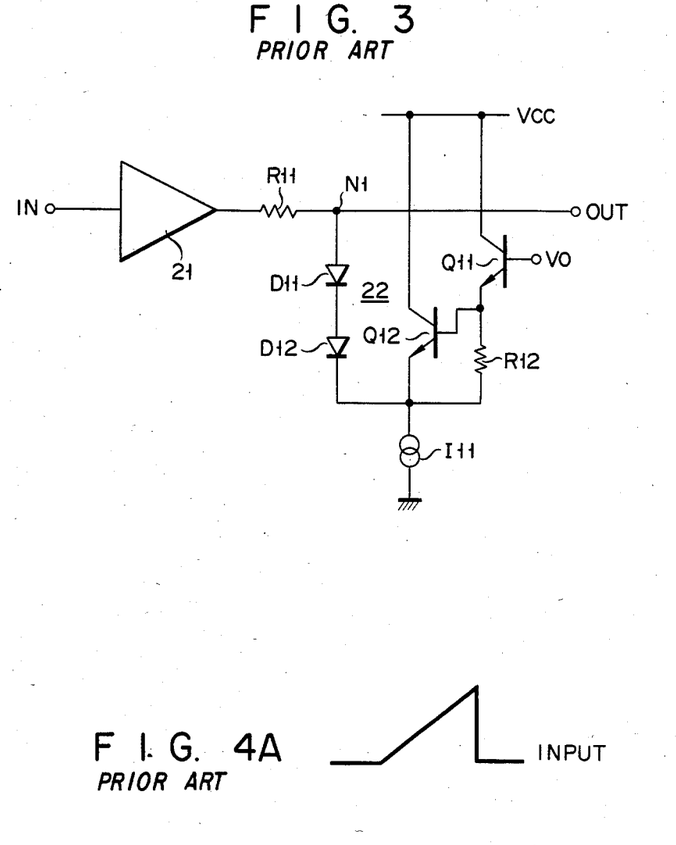
FIG. 3 shows a circuit diagram of a second conventional gamma correction circuit.
FIGS. 4A and 4B show waveform charts of input and output signals obtained in the circuit of FIG. 3.
Figure 4B:
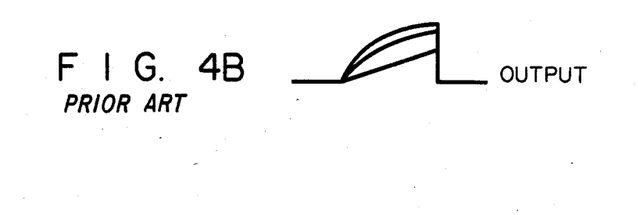
Figure 5:
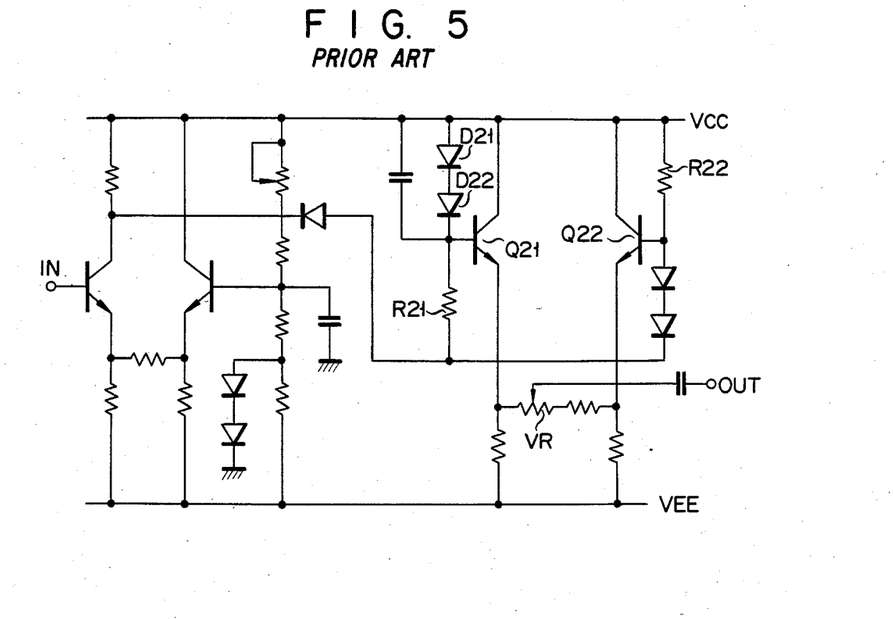
FIG. 5 shows a circuit diagram of a third conventional gamma correction circuit.

A circuit for this purpose is generally called a gamma correction circuit which can correct the characteristics of the luminance signal at the transmission end so as to make them coincide with the characteristics of the picture tube at the receiver end. FIGS. 1, 3 and 5 show conventional gamma correction circuits, respectively; FIGS. 2A and 2B and FIGS. 4A and 4B respectively show input and output signals therefrom.

Referring to FIG. 1, the gamma ($\gamma$) correction circuit comprises an amplifier 11 which includes an input transistor Q1, a transistor Q2 to which base a DC bias voltage V1 is applied, resistors R1 and R2, and DC current sources I1 and I2. It further comprises a variable impedance circuit 12 onnected to the amplifier 11 including a transistor Q3, a resistor R3, a diode D1 and a DC current source I3, and a variable impedance circuit 13 connected also to the amplifier 11 including a transistor Q4, a resistor R4, a diode D2 and a DC current source I4. The amplifier 11 amplifies an input video signal supplied to an input terminal IN, which is constituted by a luminance signal and a chrominance signal, using a gain of the ratio of the resistor R2 to the resistor R1. When an output from the amplifier 11 exceeds a DC base bias voltage V2 of the transistor Q3 in the variable impedance circuit 12, the input video signal is amplified by a gain determined by a ratio of a parallel resistance R2-3 of the resistors R2 and R3 to the resistor R1. Furthermore, when the output from the amplifier 11 exceeds a DC base bias voltage V3 of the transistor Q4, the input video signal is amplified by a gain determined by a ratio of a parallel resistance R2-3-4 of the resistors R2, R3 and R4 to the resistance of the resistor R1. It should be noted that the summed resistance of parallel-connected resistors e.g. R2 and R3 will be referred to "a parallel resistance R2-3" in the specification.

The operation of this conventional circuit is to vary gains stepwise. Specifically, a change in gain is substantially approximated by a polygonal approximation method to obtain finally desired gamma characteristics. When a triangular wave which only includes the luminance signal shown in FIG. 2A is supplied to the input terminal IN as the input video signal, a luminance signal which has been gamma corrected is obtained as shown in FIG. 2B.

In the conventional circuit of the type described above, if the gains of the amplifier and the variable impedance circuits, i.e., the operating points of the respective variable impedance circuits are properly set, a predetermined output level can be obtained independently of values used for gamma correction. However, in order to obtain desired values used for gamma correction, the bias voltages V2 and V3 of the variable impedance circuits 12 and 13 must be accurately determined. Since the values used for gamma correction greatly vary in accordance with the preset voltage level, the biasing voltages are difficult to be controlled. Moreover because this conventional circuit introduces the polygonal approximation method, there is essential defect for high precise $\gamma$-correction.

FIG. 3 shows another type of the conventional gamma ($\gamma$) correction circuit. This circuit is constituted by a buffer amplifier 21 and a variable impedance circuit 22 which comprises transistors Q11 and Q12, a resistor R12, diodes D11 and D12, and a DC current source I11. The output of the buffer amplifier 21 is connected via the resistor R11 to the variable impedance circuit 22. The input video signal is amplified by the buffer amplifier 21 and an outut video signal which has been gamma connected is produced at the node N1 between the resistr R11 and the variable impedance circuit 22.

In this prior art circuit, after the level of the signal appearing at the node N1 becomes higher than that of a DC bias voltage V0 for the transistor Q11, if the output level of the amplifier 21 is changed, then a current flowing through the resistor R11 and the diodes D11 and D12 is changed. As a result, since impedances of the diodes D11 and D12 are changed, the gamma correction is effected.

In the circuit described above, impedance change of the diodes D11 and D12 represents exponential curve, so that substantially ideal gamma characteristics can be realized. However, when a triangular wave signal which includes only the luminance signal as shown in FIG. 4A is supplied to an input terminal IN as the input video signal, the peak value of the gamma corrected signal delivered to an output terminal OUT varies greatly in accordance with the value used for gamma correction, as shown in FIG. 4B.

FIG. 5 shows still another type of the conventional gamma ($\gamma$) correction circuit. The operation of this gamma correction circuit is simply described as follows. A gamma corrected signal by diodes D21 and D22 is produced from an emitter of a transistor Q21. A signal which is not gamma corrected is produced from an emitter of a transistor Q22. These two signals are mixed at the various mixture rate using a potentiometer VR so as to obtain a video output signal which has been properly gamma corrected.

However, in this circuit, the level of the signal obtained at the emitter of the transistor Q22 and the level of the signal obtained at the emitter of the transistor Q21 must coincide each other so as to obtain a composite gamma corrected output signal. Therefore, the level of the resultant output signal becomes very low. Furthermore, a large current must flow through resistors R21 and R22 of the base bias circuit of the transistors Q21 and Q22, resulting in large current consumption.

SUMMARY OF THE INVENTION

It is, therefore, an object of the present invention to provide a gamma correction circuit which has low current consumption, wherein the output signal level may not vary in accordance with the values used for gamma correction, and these values can be continuously changed with simple control.

A gamma correction circuit according to the invention, comprises:

gamma correction circuit means connected to receive a TV signal which has not yet been gamma corrected, having an exponential impedance changing element, and delivering at least one gamma corrected signal; and adder circuit means connected to receive said both gamma corrected signal and non-gamma corrected signal, in which said gamma corrected signal is added to said non-gamma corrected signal at a desired adding ratio with keeping their signal levels between said both signals coincident.

According to the gamma correction circuit of the invention, the output signal level may not be changed in accordance with the values for gamma correction, the values for gamma correction can be continuously changed with simple control without requiring complex control, and only low current consumption is required.

BRIEF DESCRIPTION OF THE DRAWINGS

The invention will be best understood with reference to the accompanying drawings, in which.

DETAILED DESCRIPTION OF THE PREFERRED EMBODIMENTS

A. Fundamental Operation of the Circuit

Figure 6:
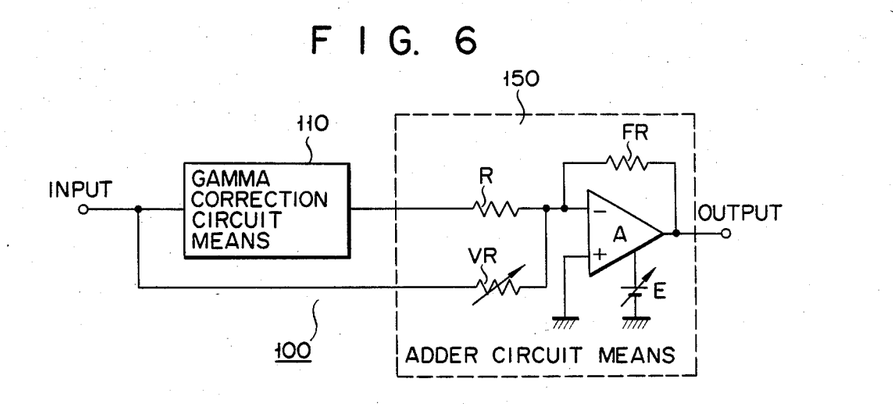
FIG. 6 schematically shows a block diagram for explaining the fundamental operation of a gamma correction circuit according to the invention.

Before proceeding with the various types of the preferred embodiments, a fundamental operation of the gamma correction circuit according to the invention will be explained with reference to FIG. 6.

A TV signal which has not yet been gamma corrected is supplied to an input of a gamma correction circuit 100 in accordance with the invention, which comprises a gamma correction circuit means 110 having an exponential impedance changing element such as a diode, and an adder circuit means 150. The TV signal is, on one hand, gamma corrected in the gamma correction circuit means 110 based upon the properly selected value used for gamma correction, e.g., 0.45, and is, on the other hand, directly supplied to one input of the adder circuit means 150. The resultant output signal derived from the gamma correction circuit means 110, i.e., the gamma corrected signal is supplied to the other input of the adder circuit means 150.

Then, the gamma corrected signal derived from the gamma correction circuit means 110 is added to the original TV signal, i.e., a non-gamma corrected signal with keeping levels between both signals coincident in the adder circuit means 150 by adjusting gains for said both signals, i.e., selecting the resistance ratio of a resistor R to a variable resistor or potentiometer VR so as to obtain the gamma corrected TV signal having the proper signal level.

The adding ratio of the gamma corrected signal to the non-gamma corrected signal is adjustable by properly setting DC voltage E.

B. First Embodiment

Figure 7:
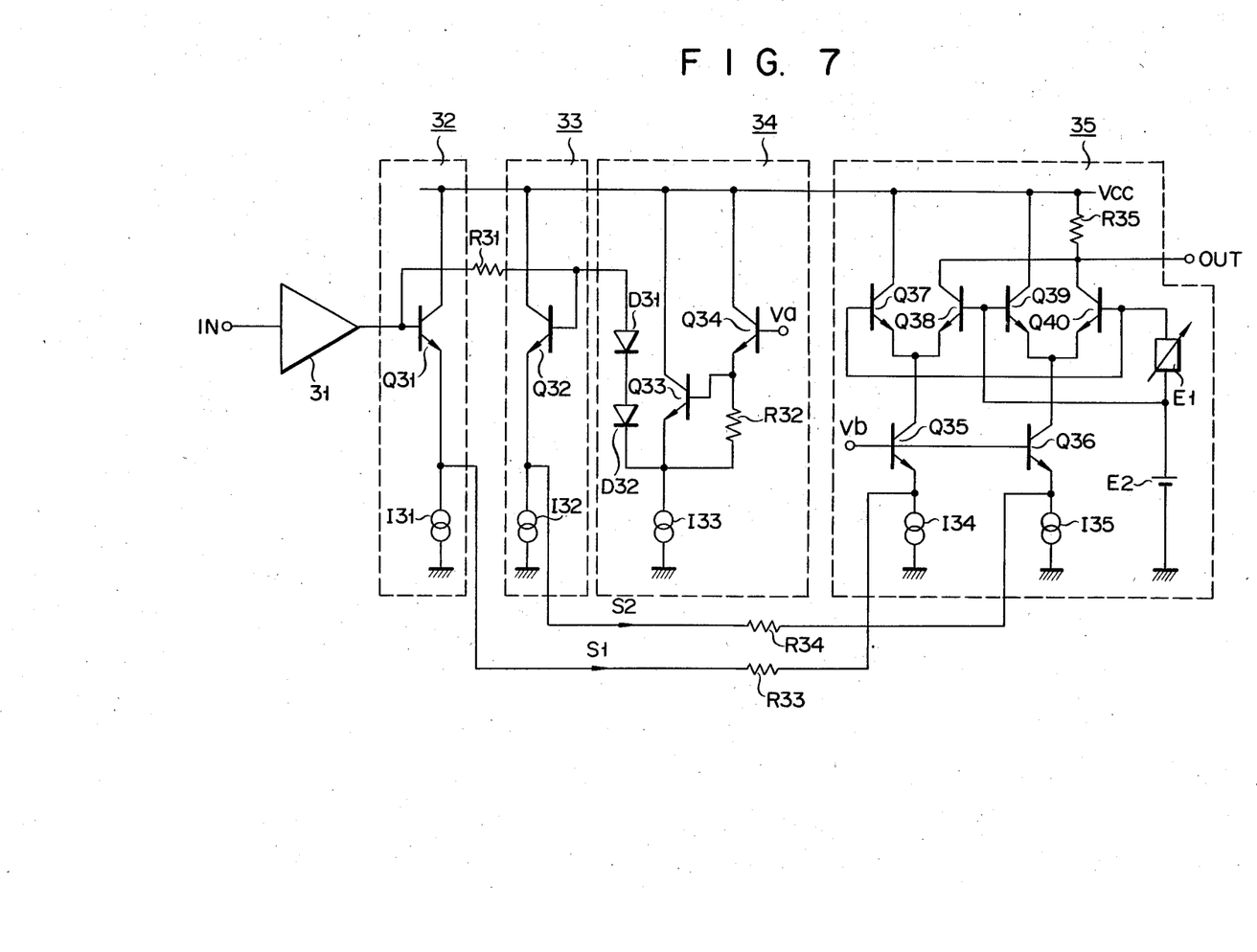
FIG. 7 shows a circuit diagram of a first gamma correction circuit according to the invention.

FIG. 7 is a circuit diagram showing a gamma correction circuit provided in the transmission end according to a first embodiment of the present invention. Referring to FIG. 7, an amplifier 31 amplifies a TV picture signal including the luminance signal and the chrominance signal which has not yet been gamma corrected. The amplifier 31 also has the function of impedance conversion. An output of the amplifier 31 is connected to the base of a transistor Q31 and to one end of a resistor R31. The collector of the transistor Q31 is connected to a positive source voltage terminal VCC, and the emitter thereof is grounded through a DC current source I31. The transistor Q31 and the DC current source I31 constitute a buffer amplifier 32 which is indicated by the dotted line in the drawing and which amplifies the output signal from the amplifier 31 so as to produce the non-gamma corrected signal S1. The other end of the resistor R31 is connected to the base of a transistor Q32 and to the anode of a diode D31. The collector of the transistor Q32 is also connected to the positive source voltage terminal VCC, and the emitter thereof is grounded through a DC current source I32. The transistor Q32 and the DC current source I32 constitute a buffer amplifier 33 indicated by the dotted line in the drawing. The buffer amplifier 33 has an output terminal as the emitter of the transistor Q32 and amplifies a signal appearing at the node between the resistor R31 and the diode D31. The cathode of the diode D31 is connected to the anode of a diode D32. The cathode of the diode D32 is grounded through a DC current source I33. The emitter of a transistor Q33 is connected to the cathode of the diode D32, and the emitter of a transistor Q34 is connected to the cathode of the diode D32 through a resistor R32. The base of the transistor Q33 is connected to the emitter of the transistor Q34. The collectors of the transistors Q33 and Q34 are connected to the positive source voltage terminal VCC. A DC bias voltage Va is applied to the base of the transistor Q34. The above-mentioned diodes D31 and D32, the transistors Q33 and Q34, the resistor R32 and the DC current source I33 constitute a variable impedance circuit 34 indicated by the dotted line. The diodes D31 and D32 of the variable impedance circuit 34 may function as the impedance means and change exponentially their AC impedances in accordance with a current flowing therethrough so as to produce the gamma corrected signal S2.

The output from the buffer amplifier 32, that is, output signal (emitter signal) S1 from the transistor Q31 is supplied to the emitter of a transistor Q35 through a resistor R35. Similarly, the output from the buffer amplifier 33, that is, an output signal (emitter signal) S2 from the transistor Q32 is supplied to the emitter of a transistor Q35 through a resistor R34.

The transistors Q35 and Q36 constitute a double balance type adder circuit 35 together with transistors Q37, Q38, Q39 and Q40, a load resistor R35, a DC variable voltage source E1, a DC voltage source E2 and DC current sources I34 and I35. The emitter of the transistor Q35 is grounded through the DC current source I34, and the collector thereof is connected to the common node of the emitters of the transistors Q37 and Q38. The collector of the transistor Q37 is directly connected to the positive source voltage terminal VCC, and the collector of the transistor Q38 is also connected to the positive source voltage terminal VCC through the resistor R35. The emitter of the transistor Q36 is grounded through the DC current source I35, and the collector thereof is connected to the common node of the emitters of the transistors Q39 and Q40. The collector of the transistor Q39 is directly connected to the positive source voltage terminal VCC, and the collector of the transistor Q40 is connected to the collector of the transistor Q38. Furthermore, the bases of the transistors Q37 and Q40 are mutually connected, and the common node thereof is connected to one terminal of the DC variable voltage source E1. The bases of the transistors Q38 and Q39 are commonly connected, and the common node thereof is connected to the other terminal of the DC variable voltage source E1. The other terminal of the DC variable voltage source E1 is connected to the positive terminal of the DC constant voltage source E2. The negative terminal of the voltage source E2 is grounded. The bases of the transistors Q35 and Q36 are commonly connected, and the common node thereof receives a DC constant bias voltage Vb. The combination of the resistors R33, R34 and R35 functions as the adding ratio of the gamma corrected signal S2 to the non-gamma corrected signal S1.

In the gamma correction circuit, as previously described, the non-gamma corrected signal S1 is produced from the emitter of the transistor Q31. The gamma corrected signal S2 is produced from the emitter of the transistor Q32 under the control of the bias voltage Va, in the same manner as shown in the conventional circuit shown in FIG. 3. In other words, the waveform of this signal S2 follows the exponential curve. Thereafter, the signal S1 and the signal S2 are added by the given adding ratio in the adder circuit 35. The operation of the adder circuit 35 will be described hereinafter.

The signals S1 and S2 which are supplied to the emitters of the transistors Q35 and Q36 respectively appear at the collectors thereof as they are. If the DC variable voltage source E1 is so set that the bases of the transistors Q37 and Q40 are kept positive and the bases of the transistors Q38 and Q39 are kept negative, and further a maximum voltage of E1 is obtained, the transistors Q37 and Q40 are turned on, while the transistors Q38 and Q39 are turned off. Namely, the DC variable voltage source E1 is required to be properly adjusted in such a manner that the transistors Q37 and Q40 are turned on sufficiently and simultaneously the transistors Q38 and Q39 are turned off sufficiently. At the same time, the signal S1 appearing at the collector of the transistor Q35 appears at the collector of the transistor Q37 which has been turned on. Similarly, the signal S2 appearing at the collector of the transistor Q36 appears at the collector of the transistor Q40 which has been turned on. As a result, only the gamma corrected signal S2, that is, the signal appearing at the emitter of the transistor Q32 is delivered at an output OUT. In this state the gain of the adder circuit 35 is R35/R34.

If the DC variable voltage source E1 is so set that the bases of the transistors Q38 and Q39 are kept positive and the bases of the transistors Q37 and Q40 are kept negative, and a maximum voltage of E1 is obtained, the both transistors Q38 and Q39 are turned on, while the both transistors Q37 and Q40 are turned off. In this case, the signal S1 appearing at the collector of the transistor Q35 appears at the collector of the transistor Q38 which is turned on. Similarly, the signal S2 appearing at the collector of the transistor Q36 appears at the collector of the transistor Q39 which has been turned on. As a result, only the non-gamma corrected signal S1, that is, the signal appearing at the emitter of the transistor Q31 is delivered at the output OUT. In this state the gain of the adder circuit 35 is R35/R33.

When the Dc variable voltage source E1 is set at 0 V, that is, when the output voltage thereof is 0 V, the output voltage is simultaneously supplied from the DC constant voltage source E2 to the bases of the transistors Q37, Q38, Q39 and Q40. Therefore, the conductivity of the transistors Q37, Q38, Q39 and Q40 becomes equal each other, so that signals which each has a half level of the signal S1 appearing at the collector of the transistor Q35 appear at the collectors of the transistors Q37 and Q38 respectively. Similarly, signals which each has a half level of the signal S2 appearing at the collector of the transistor Q36 appear at the collectors of the transistors Q39 and Q40 respectively. As a result, 50% of the non-gamma corrected signal S1 is added to 50% of the gamma corrected signal S2 by the adder circuit 35. In this case, the gain of the adder circuit 35 for the gamma corrected signal S2 is $\frac{1}{2} \cdot (R35/R34)$, whereas the gain for the non-gamma corrected signal S1 is $\frac{1}{2} \cdot (R35/R33)$.

Setting properly the biasing voltage of the DC variable voltage source E1 enables the adding ratio of the signals S2 to S1 to be arbitrarily changed.

On the other hand, the non-gamma corrected signal S1 from the buffer amplifier 32 and the gamma corrected signal S2 from the buffer amplifier 33 have different output levels each other, as previously explained. However, since the gain of the adder circuit 35 for the signal S1 from the buffer amplifier 32 is represented as R35/R33, and the same for the signal S2 from the buffer amplifier 33 is represented as R35/R34, the output levels of the buffer amplifiers 32 and 33 may coincide with each other if the resistances involved are adequately determined.

If a value for gamma correction of the output signal from the buffer amplifier 32 is 1 (i.e., gamma ($\gamma$)=1) and a value for gamma correction of the output signal from the buffer amplifier 33 is set to be 0.45 (i.e., a gamma ($\gamma$)=1/0.45 or about 2.2), the value for whole gamma correction which is obtained at the output OUT can be continuously changed within a range of 0.45 and 1 by simple control (the output biasing voltage of the DC variable voltage source E1 is set to be a desired value). In other words, when the gamma exists within a range between 1 and 2.2, the value for gamma correction falls within a range between 1 to 0.45. Furthermore, the output level can be kept constant independently of the values for gamma correction because both gains are relatively adjusted.

Further, the gamma correction circuit according to the present invention has advantages in that since the bias voltage Va is set constant, complex biasing control is not required, and in that a large current may not flow in the circuit, thus decreasing power consumption.

C. Second Embodiment

Figure 8:
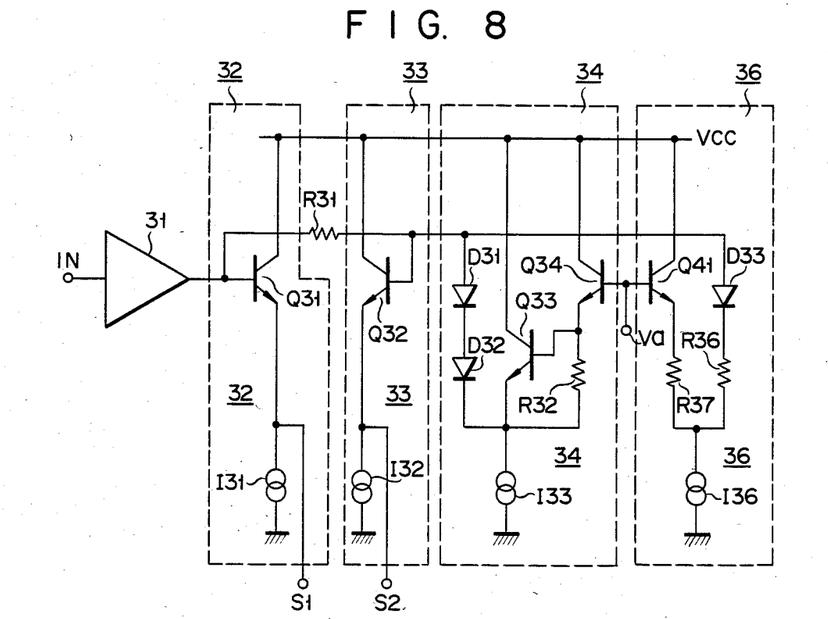
FIG. 8 shows a circuit diagram of a second gamma correction circuit according to the invention.

FIG. 8 shows a gamma correction circuit according to a second embodiment of the present invention. The gamma correction circuit of the second embodiment is substantially the same as that of the first embodiment, except that another variable impedance circuit 36 having a transistor Q41, a diode D33, resistors R36 and R37, and a DC current source I36 is connected to the other end of the resistor R31, in addition to the variable impedance circuit 34. The other end of the resistor R31 is connected to the anode of the diode D33. The cathode of the diode D33 is connected to one end of the resistor R36. The other end of the resistor R36 is grounded through the DC current source I36. The other end of the resistor R36 is also connected to one end of the resistor R37. The other end of the resistor R37 is connected to the emitter of the transistor Q41. The collector of the transistor Q41 is connected to the positive source voltage terminal VCC, and the base thereof receives the DC bias voltage Va, that is the common one for the another variable impedance circuit 34. The output signals S1 and S2 respectively from the buffer amplifiers 32 and 33 are added by an adder circuit (not shown) 35 in the same manner as in the first embodiment.

In the gamma correction circuit having the arrangement described above, the two variable impedance circuits 34 and 36 are employed to perform a more precise gamma correction. That is, a more ideal gamma correction curve can be obtained by combining two different gamma correction curves which indicate the same operating points with respect to the bias voltage Va but have different slopes, and which are obtained from the variable impedance circuits 34 and 36 respectively.

D. Third Embodiment

Figure 9:
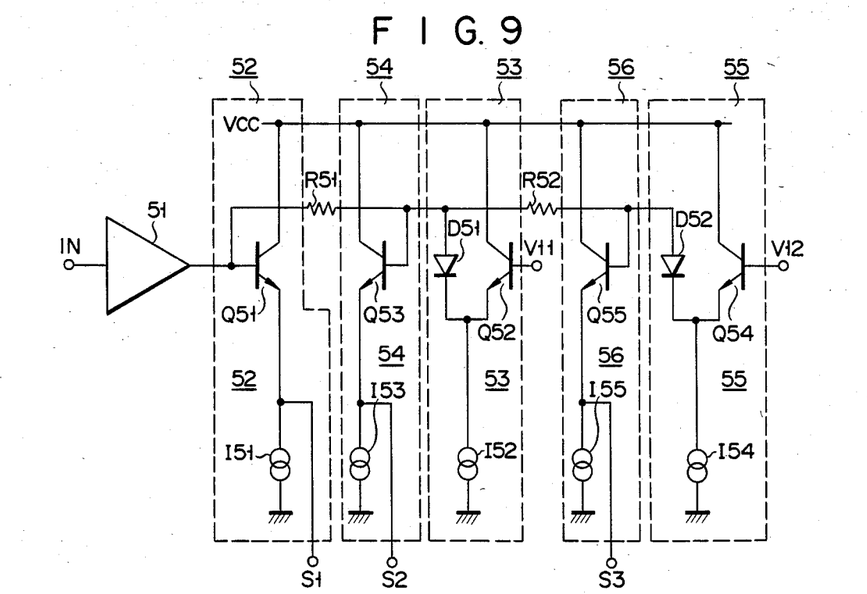
FIG. 9 shows a circuit diagram of a third gamma correction circuit according to the invention.

FIG. 9 is a circuit diagram of a gamma correction circuit according to a third embodiment of the present invention. In this circuit, an amplifier 51 having a video signal input terminal IN is connected to a buffer amplifier 52 including a transistor Q51 and a DC current source I51. The output from the amplifier 51 is connected to one end of a resistor R51. The other end of the resistor R51 is connected to a variable impedance circuit 53 which comprises a diode D51, a transistor Q52 of which base receives a DC bias voltage V11, and a DC current source I52. A buffer amplifier 54 comprises a transistor Q53 and a DC current source I53 which is connected to the variable impedance circuit 53 and also to the other end of the resistor R51 in order to receive the input TV signal through the amplifier 51 and the resistor R51. The other end of the resistor R51 is connected to one end of a resistor R52. The other end of the resistor R52 is connected to a variable impedance circuit 55 which comprises a diode D52, a transistor Q54 having the base which receives a DC bias voltage V12, and a DC current source I54. A buffer amplifier 56 comprises a transistor Q55 and a DC current source I55 which is connected to the variable impedance circuit 55 and also to the other end of the resistor R52 in order to receive the input TV signal through the amplifier 51 and the resistors R51, R52.

The gamma correction circuit having the arrangement described above is operated as follows. An output TV picture signal from the amplifier 51 is amplified by the buffer amplifier 52 to produce the non-gamma corrected signal S1 (=the value for gamma correction of 1 i.e., gamma=1). A signal appearing at the node between the resistor R51 and the diode D51 is amplified by the buffer amplifier 54 to obtain the signal S2 having the value for gamma correction which is less than 1. A signal (i.e., the amplified picture signal) appearing at the node between the resistor R52 and the diode D52 is amplified by the buffer amplifier 56 to produce a signal S3 which has the different value for gamma correction from that of the output signal derived from the buffer amplifier 54, this value for gamma correction being also less than 1. The output S1 from the buffer amplifier 52 and one of the outputs S2 and S3 respectively from the buffer amplifiers 54 and 56 are added by the adder circuit 35 (not shown) in the manner described. After one of the outputs S2 and S3 has been selected by a known selector circuit (not shown). As a result, a desired signal having the value for gamma correction can be obtained.

E. Modification

The invention is not restricted to the embodiments described before. Various modifications may be realized without departing from the technical scope and spirit of the invention.

For example, in the third embodiment, the gamma corrected signal either S2 or S3 was selectively added to the non-gamma corrected signal S1. It is also possible to combine in the known manner both gamma corrected signals S2 and S3 at the given ratio and thereafter to add them to the non-gamma corrected signal S1.

If the impedance matching is adequately effected between the gamma correction circuits of the above three embodiments and the pre-stage circuit thereof, it is possible to omit the impedance converting amplifiers (31, 51), so that the TV picture signal can be directly applied to the post-stage buffer amplifiers e.g. 32.

What is claimed is:

1. A gamma correction circuit comprising:
    an input terminal,
    first gamma correction circuit means including an exponential impedance changing element for gamma-correcting a non-gamma corrected input signal applied to the input terminal to produce a gamma-corrected signal,
    current adder circuit means for adding said gamma-corrected signal to said non-gamma corrected input signal, said adder circuit means comprising a double balance type adder circuit coupled to a series arrangement of variable and fixed DC voltage sources, and having first and second input terminals respectively connected to receive said gamma-corrected signal and said non-gamma corrected input signal, said current adder circuit means further having a combination of adjustable resistance means to add said gamma-corrected signal to said non-gamma corrected input signal at a desired adding ratio, while maintaining the signal levels of said gamma-corrected signal and said non-gamma corrected input signal coincident, by adjustment of the relative resistance values of the combination of resistance means and varying the voltage of said variable voltage source.

2. A gamma correction circuit as claimed in claim 1, wherein said first gamma correction circuit means includes a first buffer amplifier connected through first fixed impedance means to the input terminal to receive said non-gamma corrected input signal, and wherein said exponential impedance changing element comprises first variable impedance diode means having non-linear characteristics to produce the gamma-corrected signal.

3. A gamma correction circuit as claimed in claim 2, further comprising:

amplifier/impedance converting means and a second buffer amplifier, said amplifier/impedance converting means being interposed between the input terminal and the first buffer amplifier and being directly connected to receive said non-gamma corrected input signal, the output signal from said amplifier/impedance converting means being supplied through said first fixed impedance means and said first buffer amplifier to said first input of said current adder circuit means connected to receive the gamma corrected signal, and through said second buffer amplifier to said second input of the current adder circuit connected to receive the non-gamma corrected input signal.

4. A gamma correction circuit as claimed in claim 3, further comprising:

second variable impedance diode means connected in parallel with said first variable impedance diode means, a bias voltage source, the first and second variable impedance diode means being controlled by the same bias voltage from said bias voltage source, and wherein the exponential characteristic curve of the first variable impedance diode means is different from that of the second variable impedance diode means.

5. A gamma correction circuit as claimed in claim 3, further comprising:

second gamma correction circuit means connected in parallel with said first fixed impedance means through second fixed impedance means to produce a second gamma corrected signal different from said first gamma corrected signal, and means for selectively supplying said first and second gamma corrected signals to said first input of said current adder circuit means.

6. A gamma correction circuit as claimed in claim 3, further comprising:

second gamma correction circuit means connected in parallel with said first fixed impedance means through second fixed impedance means to produce a second gamma corrected signal different from said first gamma corrected signal, and means for combining said first and second gamma corrected signals at a selected ratio to produce a combined gamma corrected signal and supplying the combined gamma corrected signal to said first input of said current adder circuit.

7. A gamma correction circuit as claimed in claim 1 wherein said exponential impedance changing element comprises first variable impedance diode means having non-linear characteristics to produce the gamma-corrected signal.

* * * * *